United States Patent [19]

Benefiel et al.

[11] Patent Number: 5,331,026
[45] Date of Patent: Jul. 19, 1994

[54] ELECTROCOATING COMPOSITION COMPRISING THE SOLID PIGMENT DISPERSION

[75] Inventors: James W. Benefiel, Northville; Peter D. Clark, Farmington Hills; Laura M. Lanni, Waterford, all of Mich.

[73] Assignee: BASF Corporation, Southfield, Mich.

[21] Appl. No.: 75,848

[22] Filed: Jun. 11, 1993

Related U.S. Application Data

[63] Continuation of Ser. No. 722,625, Jun. 27, 1991, abandoned.

[51] Int. Cl.⁵ .............................................. C08L 63/00
[52] U.S. Cl. ..................................... 523/456; 523/400; 523/414; 523/415; 523/417; 523/420; 523/427; 524/901; 525/528
[58] Field of Search ............... 523/456, 400, 414, 415, 523/417, 420, 427; 524/901; 525/528

[56] References Cited

U.S. PATENT DOCUMENTS

| | | | |
|---|---|---|---|
| 4,446,257 | 5/1984 | Kooijmans et al. | 523/404 |
| 4,608,314 | 8/1986 | Turpin et al. | 528/45 |
| 4,612,338 | 9/1986 | Chung et al. | 524/901 |
| 4,742,097 | 5/1988 | Turpin et al. | 523/411 |
| 4,872,961 | 10/1989 | McIntyre et al. | 524/901 |
| 4,946,507 | 8/1990 | Peng et al. | 523/400 |
| 5,034,434 | 7/1991 | Beresford et al. | 528/103 |
| 5,035,785 | 7/1991 | Debroy et al. | 523/415 |
| 5,064,880 | 11/1991 | Rao et al. | 523/415 |
| 5,116,914 | 5/1992 | Chang et al. | 525/528 |
| 5,128,393 | 7/1992 | Peng et al. | 523/415 |
| 5,130,004 | 7/1992 | Johnson et al. | 523/415 |
| 5,135,970 | 8/1992 | Honel et al. | 523/417 |

Primary Examiner—John C. Bleutge
Assistant Examiner—Randy Gulakowski
Attorney, Agent, or Firm—Anne Gerry Sabourin

[57] ABSTRACT

The present invention is directed to a process for producing an aqueous cathodic electrocoating composition comprising A) mixing
  i) a powder comprising a dispersion of a pigment in a solid resin
  ii) a principal resin
  iii) a crosslinker and optionally
  iv) an additive selected from the group consisting of organic solvents, catalysts, wetting agents, conditioning agents, thickeners, rheology control agents, antioxidants, surfactants, leveling agents and mixtures thereof
B) salting with an acid and
C) dispersing in deionized water.

14 Claims, No Drawings

ELECTROCOATING COMPOSITION COMPRISING THE SOLID PIGMENT DISPERSION

This is a continuation of copending application Ser. No. 07/722,625, filed on Jun. 27, 1991, now abandoned.

FIELD OF THE INVENTION

The present invention is directed to a cathodic electrocoating composition for coating of metallic substrates, more specifically it is directed to an electrocoating composition containing a powder pigment dispersion.

BACKGROUND OF THE INVENTION

Cathodic electrodeposition as a coating application method for metallic substrates is well known and discribed for example in U.S. Pat. Nos. 4,575,523; 4,661,541; 4,780,524 and 4,920,162.

The electrocoating composition comprises the cationic resin (principal resin), a crosslinker, a grind resin, pigments and other additives such as solvents, control agents, fillers and the like.

Typically, a principal resin is prepared by adducting an epoxy resin with an amine. An aqueous electrodeposition coating bath is prepared by mixing the principal resin with a crosslinking agent and salting it with acid and deionized water to form a dispersion, mixing the dispersion with a pigment paste and optionally with other additives like solvents, antifoam and the like.

Pigment pastes are usually prepared by dispersing a pigment in a grinding resin in the presence of plasticizers, wetting agents, surfactants or other ingredients in a ball mill, sand mill, cowles mill or continuous mill until the pigment has been reduced to the desired particle size and is wetted by the resin or dispersed in it.

One disadvantage of pigment pastes is that they contain volatile organic compounds.

It is therefore an object of the present invention to provide a process for the preparation of a cathodic electrocoating composition with very low VOC but good pigment dispersibility comprising a powder of a dispersion of a pigment in a solid resin. Another object of the invention is an aqueous cathodic electrocoating composition. Another object of the invention is a process for the preparation of an aqueous electrocoating composition from a one component electrocoating composition.

SUMMARY OF THE INVENTION

The objects of the present invention are achieved with a process for producing an aqueous cathodic electrocoating composition comprising
a) mixing
  i) a powder comprising a dispersion of a pigment in a solid resin
  ii) a principal resin
  iii) a crosslinker and optionally
  iv) an additive selected from the group consisting of organic solvents, catalysts, wetting agents, conditioning agents, thickeners, rheology control agents, and mixtures thereof
b) salting with an acid and
c) dispersing in deionized water.

DETAILED DESCRIPTION OF THE INVENTION

The powder comprising a dispersion of a pigment in a solid resin (i) comprises a solid resin which can be non-ionic and non-water dispersible or which can be amine functional and water dispersible when salted (acidified) with acid.

The non-ionic resins comprise any suitable film forming material which is solid at room temperature like acrylic, polyester, alkyd, polyurethane, epoxy, aminoplast, resins and mixtures thereof.

The term acrylic resin refers to the resins typically prepared by the polymerization of ethylenically unsaturated monomers. Suitable ethylenically unsaturated monomers include acrylic and methacrylic acid and their alkyl esters such as methyl, ethyl, propyl, butyl, 2-ethyl hexyl, decyl, lauryl, stearyl, isobornyl, and the functional esters such as hydroxyethyl, hydroxypropyl, hydroxybutyl, acrylamide, acetoacetoxyethyl, glycidyl, diacrylates such as 1,4 butanedioldiacrylate, ethylene glycol dimethacrylate, 1,6 hexanediol diacrylate, ethylenically unsaturated aromatic hydrocarbons such as styrene, alpha methyl styrene, vinyl toluene, vinyl chloride, acrylonitrile, butadiene, divinylbenzene, and others such as maleic acid or anhydride, fumaric acid, allyl alcohol, crotonic acid, etc.

The term polyester resin refers to those types generally used in baking, and ambient cure applications and includes alkyd resins. Typically, these resins are a result of a stoichiometric blend of a polyhydric alcohol with a polybasic acid. Often, monohydric alcohols or monobasic acids may be blended into the polyester for molecular weight control. These resins may or may not be modified with a saturated or unsaturated fatty acid. Examples of polyhydric alcohols include ethylene glycol, propylene glycol, neopentyl glycol, cyclohexyl dimethanol, diethylene glycol, dipropylene glycol, hydrogenated bisphenol A, 1,6 hexanediol, glycerol, trimethylol propane, pentaerythritol, sorbitol, etc. Examples of polybasic acids include maleic acid, fumaric acid, succinic acid, glutaric acid, adipic acid, phthalic acid, isophthalic acid, tetrahydrophthalic acid, itaconic acid, trimellitic acid, and the anhydrides of the above where they exist. Examples of fatty acids include those derived from the oils of linseed, soya, castor, coconut, tall, safflower, etc. Optionally, any of the aforementioned oils may be "broken" or prereacted with any of the aforementioned polyols to be later incorporated into the polyester resin.

The term polyurethane resin refers to those types generally used in baking and ambient cure applications. Typically, these resins are a result of a stoichiometric blend of polyhydric alcohol with a polyisocyanate. Often, monohydric alcohols or monoisocyanates may be blended to control the molecular weight. Examples of polyhydric alcohols include those previously listed. Examples of polyisocyanates include toluene diisocyanate, diphenylmethane diisocyanate, hexamethylene diisocyanate, isophorone diisocyanate, dicyclohexyl methane dissocyanate, biurets of and isocyanurates of the aforementioned where they exist, etc.

The term epoxy resin refers to those resins constructed through an oxirane functional group reacted with a phenolic or caboxylic acid group. Typically, these resins are a result of stoichiometric blend of epichlorhydrin with phenolics such as bisphenol A or novolac resins, and derivatives thereof, or oxirane functional resins, such as acrylic resins prepared with glycidyl acrylate or methacrylate, and derivatives thereof.

The aminoplast resins are comprised of a nucleus or nuclei of acetoguanamine, benzoguanamine, adipoguanamine, or melamine, with the preferred being melamine. The aminoplast resin is considered to be fully alkylated, or substantially completely methylolated and subsequently substantially fully etherified with alcohol, with the number of alkyloxymethyl groups ranging from 2 n-2 to 2 n where n is the number of amino groups on the triazine ring. The preferred degree of polymerization of this aminoplast is from 1 to 3.

Preferred resins are acrylic and epoxy resins.

Suitable ionic resins are solid at room temperature and have amine functionality. They are described for example in U.S. Pat. Nos. 4,446,257; 4,530,945; 4,540,725 and 4,920,162. Suitable ionic resins are epoxy resin-amine adducts like an adduct of a polyglycidyl ether of a polyhydric phenol with at least one amine with at least one primary amino group.

The pigments are well known in the art and are described for example in U.S. Pat. No. 4,780,524. Suitable examples are iron oxides, lead oxides, strontium chromate, carbon black, titanium dioxide, talc, barium sulphite, barium yellow, cadmium red, chromic green, lead silicate, and the like.

The amount of pigments in the powder (i) is 10 to 90% by weight, preferably 30 to 70% by weight.

The powder (i) is prepared by mixing the pigments into molten solid resin with conventional mixing equipment like a standard production reaction vessel with propeller type mixer and heating coils to melt the solid resin or in an extruder.

The dispersed pigment/molten resin mixture is then chilled and pulverized in a mill into a powder of a size of less than 0.5 mm, preferably less than 0.10 mm.

The principal resin (ii) is known in the art and described for example in U.S. Pat Nos. 4,575,523; 4,661,541 and 4,780,524. It constitutes a self-addition aromatic or alkyl aromatic epoxy resin with at least one epoxy group with at least one amine with at least one primary or secondary amino group. A particularly useful class of polyepoxides are the glycidyl polyethers of polyhydric phenols like glycidyl polyethers of bisphenol A having epoxide equivalent weights of about 450 to about 2,000, more typically about 800 to about 1,600, and preferably about 800 to about 1,500.

Typical preferred commercial formulations of diglycidyl ether starting materials are sold under the trade names "EPON 828" and "EPON 1001" (Shell Chemical Co., Division of Shell Oil Company, 50 West 50th Street, New York, N.Y.), Araldite GY 2600 (CibaGeigy, Division of Ciba Corporation, Fair Lawn, N.J.), or DER 632 (Dow Chemical Co., Midland, Mich.).

Examples of amines with at least one primary or secondary amine group include aliphatic diamines and triamines, aliphatic alcohol amines, alkylene diamines, alkanol amines and N-alkyl substituted forms thereof. Especially preferred are the aliphatic diamines and alcohol amines having 1 to 10 carbons in the aliphatic group.

Examples for diamines are ethylene diamine, 1,2-propylene diamine, 1,3-propylene diamine, 1,2-butylene diamine, 1,3-butylene diamine, 1,4-butylene diamine, 1,5-pentalene diamine, 1,6-hexylene diamine, 1,4-diaminocyclohexane, methyl-aminopropylamine, N,N-dimethylaminopropylamine and the like.

Examples for aminoalcohols are ethanolamine, diethanolamine and N-methylethanolamine.

Preferred examples are N,N-dimethylaminopropyl amine, ethanolamine, diethanolamine and N-methylethanolamine.

In the principal resin (ii), the amine adducted to the self-addition diepoxide produces terminal amine groups. These provide the cationic sites which largely contribute to the ready dispersibility of the principal resin in the aqueous acidic medium. The equivalent ratio of amine mixture per epoxide group of the self-addition diepoxide is from 0.75 to 1, primary and secondary amines being counted as one equivalent each.

The reaction conditions are known and typically, the reaction temperature will be about 75° F. to about 220° F., more typically about 80° F. to about 190° F., and preferably about 140° F. to about 180° F. The reaction time is typically about five minutes to about 60 minutes, more typically about ten minutes to about 40 minutes and preferably about 25 minutes to about 30 minutes.

The principal resin may be prepared in a variety of suitable solvents, such as ethylene glycol monoethyl ether, ethylene glycol monobutylether, ethylene glycol monohexylether, diethylene glycol monobutylether, xylene, ethanol, isopropanol, isobutanol, n-butanol, methylisobutylketone and the like. The amount of solvent is typically 10 to 50%, preferably 25 to 35% by weight of the total weight of the principal resin.

One of the advantages of this invention is that no organic solvent is required for the pigment dispersion (i). The advantage is that the volatile organic solvents from pigment paste are not incorporated. Although, there may be organic solvents in the principal resin (ii), most of these are stripped from the resulting dispersion.

The preferred crosslinker (iii) used in the practice of this invention are the organic polyisocyanates and, in particular, the blocked polyisocyanates. The organic polyisocyanates and the blocking agents used in the practice of this invention are typical of those used in the art, e.g., U.S. Pat. No. 4,182,831 the disclosure of which is incorporated by reference.

Useful blocked polyisocyanates are those which are stable in the dispersion systems at ordinary room temperature and which react with the resinous product of this invention at elevated temperatures.

In the preparation of the blocked organic polyisocyanates, any suitable organic polyisocyanate can be used. Representative examples are the aliphatic compounds such as trimethylene, tetramethylene, pentamethylene, hexamethylene, 1,2-propylene, 1,2-butylene, 2,3-butylene and 1,3-butylene diisocyanates; the aromatic compounds such as m-phenylene, p-phenylene, 4,4'-diphenyl, and 1,4-napthalene diisocyanates; the aliphatic aromatic compounds such as 4,4'-diphenylene methane, 2,4- or 2,6-tolylene, or mixtures thereof, 4,4'-toluidine, and 1,4-xylylene diisocyanates; the triisocyanates such as triphenyl methane -4,4'4''-triisocyanate, 1,3,5-triisocyanate benzene and 2,4,6-triisocyanate toluene and the tetraisocyanates such as 4,4'-diphenyl-dimethyl methane-2,2', 5,5'tetraisocyanate; the polymerized polyisocyanates such as tolylene diisocyanate dimers and trimers, polymethylenepolyphenylene polyisocyanates having NCO functionalities of 2 to 3, and the like.

In addition, the organic polyisocyanate can be a prepolymer derived from a polyol such as glycols, e.g., ethylene glycol and propylene glycol, as well as other polyols such as glycerol, trimethylolpropane, hexanetriol, pentaerythritol, and the like as well as monoethers, such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxyl-terminated polyethers and can be linear or branched. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol trimehylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

Preferred polyisocyanates include the reaction product of toluene diisocyanate and trimethylolpropane, the reaction product of 4,4'-diphenylene methane diisocyanate and trimethylolpropane, and 4,4'-diphenylene methane diisocyanate with glycerol; additionally, the isocyanurate of hexamethylene diisocyanate.

Any suitable aliphatic, cycloaliphatic, aromatic, alkyl monoalcohol and phenolic compound can be used as a blocking agent in the practice of the present invention, such as lower aliphatic alcohols, such as methyl, ethyl, chloroethyl, propyl, butyl, amyl, hexyl, heptyl, octyl, nonyl, 3,3,5-trimethylhexanol, decyl and lauryl alcohols, and the like; the aromatic-alkyl alcohols, such as phenylcarbinol, methylphenylcarbinol, ethyl glycol monoethyl ether, ethyl glycol monobutyl ether and the like; the phenolic compounds such as phenol itself, substituted phenols in which the substituents do not adversely affect the coating operations. Examples include cresol, nitrophenol, chlorophenol and t-butyl phenol.

Also, amines can be used as blocking agent like dibutylamine.

A preferred blocking agent is monopropyl ether of ethylene glycol. Additional blocking agents include tertiary hydroxyl amines, such as diethylethanolamine and oximes, such as methylethyl ketoxime, acetone oxime and cyclohexanone oxime, and caprolactam. A preferred oxime is methyl-n-amyl ketoxime.

The blocked polyisocyanates are formed by reacting sufficient quantities of blocking agent with sufficient quantities of organic polyisocyanate under reaction conditions conventional in this art such that no free isocyanate groups are present when the reaction has run its course.

Sufficient quantities of blocked polyisocyanate are incorporated into the electrodepositable coating compositions of this invention such that the deposited coating will be completely cured upon baking. Typically, about 20% by weight to about 80% by weight of blocked polyisocyanate is mixed with the modified epoxy resin, more typically about 30% by weight to about 70% by weight, preferably about 35% by weight to about 65% by weight.

Optionally additives (iv) may be used selected from the group consisting of organic solvents, catalysts, wetting agents, conditioning agents, thickeners, rheology control agents, antioxidants, surfactants, leveling agents, and mixtures thereof.

One method for producing an aqueous cathodic electrocoating composition comprising
a) mixing
    i) a powder comprising a dispersion of a pigment in a solid resin
    ii) a principal resin
    iii) a crosslinker and optionally
    iv) an additive selected from the group consisting of organic solvents, catalysts, wetting agents, conditioning agents, thickeners, rheology control agents, surfactants and mixtures thereof
b) salting with an acid and
c) dispersing in deionized water Another method for producing an aqueous cathodic electrocoating composition comprising
a) mixing
    ii) a principal resin
    iii) a crosslinker and optionally
    iv) an additive selected from the group consisting of organic solvents, catalysts, wetting agents, conditioning agents, thickeners, rheology control agents, surfactants and mixtures thereof
b) salting with an acid,
c) dispersing in deionized water and
d) mixing with
    i) a powder comprising a dispersion of a pigment in a water soluble solid cationic resin Typically about 0.1 Meq to about 0.8 Meq of acid is used per gram of solid cationic electrocoat resin, more typically about 0.2 Meq to about 0.7 Meq, preferably about 0.2 Meq to about 0.5 Meq.

Electrodepositable cathodic coating compositions of this invention are used in an electrodeposition process as an aqueous dispersion. Sufficient quantities of the components are used so that the concentration of the components in an aqueous bath will produce a coating on an object of sufficient thickness when processed at a sufficient voltage, time and temperature so that upon baking the coating will have the desired characteristics such as filmbuild, throwpower, corrosion resistance, chip resistance, impact resistance. Typically, the concentration in water of the components of this invention are 10% by weight to about 60% by weight, typically about 20% by weight to about 60% by weight, and preferably about 30% by weight to about 60% by weight.

The electrodeposition process typically takes place in an electrically insulated tank containing an electrically conductive anode which is attached to a direct current source. The size of the tank will depend on the size of the article to be coated. Typically the tank is constructed of stainless steel or mild steel lined with a dielectric coating such as epoxy impregnated fiberglass or polyepoxide. The electrodepositable cathodic resinous coating compositions of this invention are typically used to coat articles such as automobile or truck bodies. The typical size of an electrodeposition bath tank used for this purpose is about 60,000 gallons to about 120,000 gallons capacity.

Typically the article to be coated is connected to the direct current electric circuit so that the conductive object acts as the cathode. When the article is then immersed in the coating bath, flow of electrons from the cathode to the anode, that is, conventional current flow from the anode to the cathode, results in the particles of the dispersed cationic electrodepositable resin composition being deposited on the surfaces of the article. The particles of the dispersed resin composition are positively charged and are therefore attracted to the negative cathodic surface of the object to be coated. The thickness of coating deposited upon the object during its residence in the electric cathodic coating bath is a function of the cathodic electrodepositable resin composition, the voltage across the article, the current flux, the pH of the coating bath, the conductivity, and the residence time. Sufficient voltage is applied to the coated article for a sufficient time to obtain a coating of sufficient thickness. Typically the voltage applied across the coated article is about 50 volts to about 500 volts, more typically about 200 to about 350 volts, and preferably about 225 volts to about 300 volts. The current density is typically about 0.5 amperes per sq. ft. to about 30 amperes per sq. ft., more typically about one ampere per sq. ft. to about 25 amperes per sq. ft., and preferably about one ampere per sq. ft. The article to be coated typically remains in the coating bath for a sufficient period of time to produce a coating or film of sufficient thickness having sufficient resistance to corrosion and flexibility. The residence time or holding time is typically about 1 minute to about 2½ minutes, and preferably about 2 minutes.

The pH of the coating bath is sufficient to produce a coating which will not rupture under the applied voltage. That is, sufficient pH to maintain the stability of the coating bath so that the resin does not kick-out of the dispersed state and to control the conductivity of the bath. Typically the pH is about 4 to about 7, more typically about 5 to about 6.8, and preferably about 6 to about 6.5.

The conductivity of the coating bath will be sufficient to produce a coated film of sufficient thickness.

The desirable coatings have sufficient thicknesses to provide resistance to corrosion while having adequate flexibility. Typically, the film thicknesses of the coated objects of this invention will be about 0.4 mil to about 1.8 mils, more typically about 0.6 mil to about 1.6 mils, and preferably about 0.6 mils to about 1.0 mils.

The temperature of the coating bath is maintained, typically by cooling, at a temperature less than about 90° F.

When the desired thickness of the coating has been produced, the coated object is removed from the electrodeposition bath and cured. Typically, the electrodeposited coatings are cured in a conventional convection oven at a sufficient temperature for a sufficient length of time to cause the cross-linking composition to cross-link the resin. In the case of a blocked polyisocyanate, this would be a sufficient time and temperature to unblock the blocked polyisocyanates and allow for cross-linking of the electrodepositable resin compositions. Typically, the coated articles will be baked at a temperature of about 200° F. to about 600° F., more typically about 250° F. to about 375° F., and preferably about 290° F. to about 350° F. The coated articles will be baked for a time period of about ten minutes to about 40 minutes, more typically about ten minutes to about 35 minutes, and preferably about 15 minutes to about 30 minutes.

It is contemplated that the coated articles of the present invention may also be cured by using radiation, vapor curing, contact with heat transfer fluids and equivalent methods.

Typically, the coated articles of this invention will comprise conductive substrates such as metal, including steel, aluminum, copper, etc.; however, any conductive substrate having a conductivity similar to the aforementioned metals may be used. The articles to be coated may comprise any shape so long as all surfaces can be wetted by the electrodeposition bath. The characteristics of the article to be coated, which have an effect on the coating, include the shape of the article, the capacity of the surfaces to be wetted by the coating solution, and the degree of shielding from the anode. Shielding is defined as the degree of interference with the electromotive field produced between the cathode and the anode, thereby preventing coating composition from being deposited in those shielded areas. A measure of the ability of the coating bath to coat remote areas of the object is throwpower. Throwpower is a function of the electrical configuration of the anode and cathode as well as the conductivity of the electrodeposition bath.

The invention provides good pigment dispersion, less pigment settling characteristics in the electrocoat bath, a reduced amount of the total pigment, and a low VOC-coating. The invention offers an additional advantage in that the electrocoating composition can be produced as a one-component material before dispersing in deionized water. The coating of the coated article exhibit good appearance, hiding, gloss, film thickness, corrosion resistance, impact resistance, and chip resistance.

EXAMPLES:

Preparation of a Powder (i)

100 g acrylic resin (i.e. Disperse Ayd 9100 from Daniel Products) or 100 g solid epoxy (i.e. EPON 1001 from Shell) is added to a reaction vessel and agitated while heating to molten state. 50 g carbon black and 117 g titanium dioxide are added and completely blended with the molten resin. The resulting gray mixture is then extruded, chilled, and pulverized into powder form.

Preparation of a Principal Resin (ii)

86.9 g of a liquid epoxy resin based on bisphenol A with an epoxide equivalent weight of 188 g are placed in a reaction vessel provided with a stirrer, reflux condenser, internal thermometer and a nitrogen inlet, together with 26.7 g of bispenol A, 5.98 g of xylene, and 0.056 of triphenyl phosphine. The reaction mixture is heated to 150° C. and maintained at this temperature until the epoxide equivalent weight reaches a value of 500. 15.2 g dodecyl phenol and 5.74 g xylene are added and the mixture is vacuum cooled to 115° C., which will remove 5 g xylene and any water that may be present. 0.22 g dimethyl benzyl amine (DMBA) is added and, after exotherm, the reaction mixture is held at 130° C. until an epoxide of equivalent weight of 1050 is reached. Then 8.42 g butylcellosolve, 14.92 g xylene, and 8.52 g diethanolamine (DEOA) are added and the reaction mixture is cooled to 90° C. over 1 hour. 8.12 g hexylcollosolve and 21.54 g isobutanol are added and the reaction mixture is cooled to 60° C. over 30 minutes. 2.9 g dimethylaminopropylamine (DMAPA) is added. The reaction mixture is heated to 90° C. and held for one hour.

Preparation of a Crosslinker (iii) 1

57.3 g of an 80/20 isomeric mixture of 2,4-/2,6-toluene diisocyanate, 0.0303 g of dibutyltin dilaurate, and 24.8 g of methyl isobutyl ketone are added with stirring in a nitrogen atmosphere, the temperature being maintained below 40° C. 14.7 g of trimethylolpropane are added slowly keeping the temperation <40° C. After allowing the reaction to proceed for about 1.5 hours, 34.3 g of ethylene glycol monopropyl ether is added and the mixture reaction kept 2 hours at 121° C., until essentially all the isocyanate groups are reacted. This depletion is recognized from the infrared spectrum, and back-filtration of 5 ml dibutyl amine with 0.1 g N HCl.

Preparation of Crosslinker 2

58.5 g isocyanurate of hexamethylene diisocyanate is added with stirring in a nitrogen atmosphere. 38.7 g dibutylamine is added slowly in order to keep the temperature <70° C. Hold reaction mixture at 60°-70° for 3¼ hours from time dibutylamine (DBA) add began in order to react all isocyanate groups. 24.3 g methyl isobutyl ketone is added to reduce the crosslinker to 80% non-volatile.

Preparation of the Aqueous Cathodic Electrocoating Composition and Coating of Articles 607 g of the principal resin (ii) and 337 g of the crosslinker (iii) are mixed with 10 g of acetic acid and 72 g of a propoxylated para-cresol (Paraplex WP-1 for flow, leveling, filmbuild). 4.8 g of black carbon solid pigment dispersion and 150.8 g titanium dioxide solid pigment dispersion (both powder pigment dispersions from Daniel Products) are added and mixed for 30 minutes. 188 g Deionized water is added to reduce the pigmented cationic system to 30% NV. Lead acetate and additional water to reach 20% NV are added prior to electrodeposition.

Coating of Articles

The article to be electrocoated is connected to the cathode and submerged in the electrocoat bath. Voltages from 250 to 350 V, with a bath temperature of 80° to 90° F. will produce a coating thickness of 0.4 to 0.9 mils after 2½ minutes deposition and 30 minutes curing at 325°-350° F.

We claim:

1. A process for producing an aqueous one component cathodic electrocoating composition comprising:
    A) first, forming a powder dispersion of a pigment in a solid resin selected from the group consisting of polyesters, polyurethanes, epoxies, aminoplasts, alkyd and acrylic resins by
        i) mixing pigments into molten solid resin, followed by
        ii) chilling the pigment/resin mixture and
        iii) pulverizing the mixture into a powder,
    B) subsequently, forming the electrocoating composition by
        i) first mixing together the powder dispersion of a pigment in a solid resin and a principal resin selected from the group consisting of epoxy amine adducts, and
        ii) subsequently adding a crosslinker and optionally an additive selected from the group consisting of organic solvents, catalysts, wetting agents, conditioning agents, thickeners, rheology control agents, antioxidants, surfactants, leveling agents and mixtures thereof,
    C) salting with an acid and
    D) dispersing in deionized water.

2. A process for producing an aqueous one component cathodic electrocoating composition comprising:
    A) mixing
        ii) a principal resin selected from the group consisting of epoxy-amine adducts
        iii) a crosslinker and optionally
        iv) an additive selected from the group consisting of organic solvents, catalysts, wetting agents, conditioning agents, thickeners, rheology control agents, antioxidants, surfactants, leveling agents and mixtures thereof
    B) salting with an acid,
    C) dispersing in deionized water and
    D) mixing with
        i) a powder comprising a dispersion of a pigment in a water soluble solid cationic resin.

3. A process according to claim 1, wherein the powder (i) comprises a resin selected from the group consisting of an acrylic and an epoxy resin, and a pigment selected from the group consisting of titanium dioxide, carbon black, and mixtures thereof.

4. A process according to claim 1, wherein the powder (i) comprises a resin selected from the group consisting of an acrylic and an epoxy resin, and a pigment selected from the group consisting of carbon black and titanium dioxide.

5. A process according to claim 1, wherein the powder (i) contains 30 to 70% pigments.

6. A process according to claim 1, wherein the principal resin (ii) comprises a self-addition epoxide resin-polyamine adduct.

7. A process according to claim 1, wherein the principal resin (ii) comprises 70% epoxy-amine adduct in 30% organic solvents.

8. A process according to claim 7, wherein the organic solvents are selected from the group consisting of xylene, butyl cellosolve, hexyl cellosolve, isobutanol and mixtures thereof.

9. A process according to claim 1, wherein the crosslinker (iii) comprises a blocked polyisocyanate compound.

10. A process according to claim 9, wherein the crosslinker (iii) is selected from the group consisting of an ethylene glycol monopropyl ether blocked trimethylol propane an 80/20 isomeric mixture of 2,4 toluene diisocyanate and 2,6 toluene diisocyanate, dibutyl amine-blocked adduct isocyanurate of hexamethylene diisocyanate and mixtures thereof.

11. A process according to claim 1, wherein the additive (iv) comprises a propoxylated para-cresol.

12. A process according to claim 1, wherein from about 10 to about 20% by weight of component (i) from about 40 to about 60% by weight of component (ii) from about 25 to about 40% by weight of component (iii) from about 0 to about 12% by weight of component (iv) are used the total of the weight percentages of (i), (ii), (iii) and (iv) being always 100% by weight.

13. An aqueous cathodic electrocoating composition obtainable by the process of claim 1.

14. An article electrocoated with an aqueous cathodic electrocoating composition of claim 13.

* * * * *